(12) United States Patent
Mehl

(10) Patent No.: US 9,170,423 B2
(45) Date of Patent: Oct. 27, 2015

(54) LIGHT MODULE FOR A PROJECTION APPARATUS AND METHOD FOR GENERATING THE BLUE COMPONENT IN A LIGHT MODULE FOR A PROJECTION APPARATUS

(71) Applicant: Oliver Mehl, Berlin (DE)

(72) Inventor: Oliver Mehl, Berlin (DE)

(73) Assignee: OSRAM GmbH, Munich (DE)

( * ) Notice: Subject to any disclaimer, the term of this patent is extended or adjusted under 35 U.S.C. 154(b) by 171 days.

(21) Appl. No.: 13/942,603

(22) Filed: Jul. 15, 2013

(65) Prior Publication Data

US 2014/0016297 A1    Jan. 16, 2014

(30) Foreign Application Priority Data

Jul. 16, 2012   (DE) .......................... 10 2012 212 436

(51) Int. Cl.
| | |
|---|---|
| *G03B 21/14* | (2006.01) |
| *G02B 27/10* | (2006.01) |
| *F21V 13/02* | (2006.01) |
| *G02B 26/04* | (2006.01) |
| *G02B 27/14* | (2006.01) |
| *G02B 27/28* | (2006.01) |
| *G03B 21/20* | (2006.01) |
| *H04N 9/31* | (2006.01) |

(52) U.S. Cl.
CPC ................ *G02B 27/10* (2013.01); *F21V 13/02* (2013.01); *G02B 26/04* (2013.01); *G02B 27/1006* (2013.01); *G02B 27/14* (2013.01); *G02B 27/283* (2013.01); *G02B 27/286* (2013.01); *G03B 21/204* (2013.01); *G03B 21/2073* (2013.01); *H04N 9/3114* (2013.01); *H04N 9/3161* (2013.01)

(58) Field of Classification Search
CPC .. G03B 21/14; G03B 21/204; G03B 21/2013; G03B 21/2073; H04N 9/3197
USPC ......... 353/20, 30, 31, 38, 84, 95, 96, 98, 102; 362/19, 84, 607; 349/5, 7–9; 348/743–747, 759
See application file for complete search history.

(56) References Cited

U.S. PATENT DOCUMENTS

| | | | |
|---|---|---|---|
| 7,334,897 B2* | 2/2008 | Silverstein et al. ............. | 353/20 |
| 2010/0141896 A1* | 6/2010 | Chen et al. ...................... | 353/31 |
| 2010/0201894 A1* | 8/2010 | Nakayama et al. ............ | 348/745 |
| 2011/0187998 A1* | 8/2011 | Kimura et al. .................. | 353/20 |

(Continued)

FOREIGN PATENT DOCUMENTS

JP       2012 123179       6/2012

*Primary Examiner* — Sultan Chowdhury
(74) *Attorney, Agent, or Firm* — Cozen O'Connor

(57) ABSTRACT

A light module for a projection apparatus, comprising a laser apparatus adapted to emit linearly polarized radiation in the blue wavelength range, a luminous wheel arranged in the beam path of the radiation emitted by the laser apparatus, a first beam splitter arranged in the beam path of the radiation emitted by the laser apparatus between the laser apparatus and the luminous wheel, a focusing apparatus arranged in the beam path of the radiation emitted by the laser apparatus between the first beam splitter and the luminous wheel, and at least one polarization manipulation apparatus, adapted to rotate the polarization of radiation that has passed through it twice in different directions through 90°, wherein the first beam splitter is arranged such that it is also located in the beam path of radiation in the blue wavelength range which has passed twice through the polarization manipulation apparatus in different directions.

18 Claims, 4 Drawing Sheets

(56) References Cited

U.S. PATENT DOCUMENTS

2012/0002173 A1* 1/2012 Akiyama ............... 353/30
2012/0081674 A1   4/2012 Okuda
2012/0133903 A1* 5/2012 Tanaka ............... 353/31
2012/0162614 A1* 6/2012 Kobayashi et al. ........... 353/31
2012/0242912 A1* 9/2012 Kitano ............... 348/759

* cited by examiner (SdT)

LIGHT MODULE FOR A PROJECTION APPARATUS AND METHOD FOR GENERATING THE BLUE COMPONENT IN A LIGHT MODULE FOR A PROJECTION APPARATUS

RELATED APPLICATIONS

This application claims the priority of German application no. 10 2012 212 436.5 filed Jul. 16, 2012, the entire content of which is hereby incorporated by reference.

FIELD OF THE INVENTION

The invention relates to a light module for a projection apparatus, comprising a laser apparatus adapted to emit linearly polarized radiation in the blue wavelength range, a luminous wheel arranged in the beam path of the radiation emitted by the laser apparatus, a first beam splitter arranged in the beam path of the radiation emitted by the laser apparatus between the laser apparatus and the luminous wheel, and a focusing apparatus arranged in the beam path of the radiation emitted by the laser apparatus between the first beam splitter and the luminous wheel. It furthermore relates to a method for generating the blue component in a corresponding light module.

BACKGROUND OF THE INVENTION

In projectors that use phosphors to generate light, for example LARP (Laser Activated Remote Phosphor), phosphor wheels are typically used. In LARP concepts, which use lens systems to collect the converted light and the pump light, a complicated beam path is necessary to recycle the blue radiation components. This is because the total costs of such a light module are mainly due to the provision of the blue laser light.

For this reason, the aim is to use only one light source both for pumping and for providing the blue channel. Blue light, which is not incident on any phosphor, is therefore fed back to the original beam. By using only one light source for the blue channel, considerably more compact light modules can also be produced.

In this context, FIG. 1 shows a method, known from the prior art, for addressing this problem, which is known as "wrap-around." The light module as a whole is here designated by 10. It comprises a laser apparatus 12 which is adapted to emit linearly polarized radiation in the blue wavelength range. Said radiation passes through a first beam splitter 14 which is adapted to transmit radiation in a wavelength range λ<465 nm (HT=highly transmissive) and to reflect radiation in a wavelength range λ>465 nm (HR=highly reflective). The radiation emitted by the laser apparatus 12 thus passes through the mirror 14 and impinges on a focusing apparatus 16, which is arranged between a beam splitter 14 and the luminous wheel 18.

In the light module 10, the luminous wheel 18 is shown in a side view, while in FIG. 1 it is shown at the bottom right in plan view. The luminous wheel 18 is rotatably mounted on a spindle 20 and in the present case has a region 22a, which is coated with a phosphor which converts the radiation in the blue wavelength range impinging on it into the red wavelength range. A region 22b comprises a phosphor which is adapted to convert the radiation in the blue wavelength range impinging on it into the green wavelength range, while a region 22c is coated with a phosphor that is adapted to convert the radiation in the blue wavelength range impinging on it into the yellow wavelength range. The region 24 has a slit, i.e. when this region in the light module of FIG. 1 is arranged at the top, the excitation radiation can pass through the luminous wheel 18 without being obstructed. The radiation emitted by the regions 22a, 22b, 22c passes through the focusing apparatus 16 and impinges on the mirror 14. Owing to the changed wavelength, this radiation is then reflected at the mirror 14.

However, the radiation passing through the slitted region 24 of the luminous wheel 18 impinges on a collimating apparatus 26 and subsequently in series on in the present case three deflection mirrors 28a, 28b, 28c. The last deflection mirror 28c directs the radiation onto the beam splitter 14, through which the radiation passes such that the blue radiation components are superposed onto the radiation components converted by the phosphors and are then guided to the entry aperture 30 of a projection engine 13.

The problem with the light module 10 illustrated in FIG. 1 is the space needed for this purpose. In particular in portable applications it is desirable if the light module used requires as little installation space as possible. Another disadvantage of the light module illustrated in FIG. 1 is the large amount of outlay for mounting the various optical components, which also results in undesirably high production costs.

SUMMARY OF THE INVENTION

One object of the present invention is to provide a generic light module such that it requires less installation space with comparable optical outputs.

According to one aspect of the present invention, this object can be achieved if a polarization manipulation apparatus is provided, which is adapted to rotate the polarization of radiation that has passed through it twice in different directions through 90°, wherein the first beam splitter is arranged such that it is not only located in the beam path of the radiation emitted by the laser apparatus, but also in the beam path of radiation in the blue wavelength range which has passed twice through the polarization manipulation apparatus in different directions. In this manner it becomes possible to differentiate the radiation emitted by the laser apparatus in the blue wavelength range from the non-converted radiation in the blue wavelength range to be recycled, in particular to deflect the respective radiation in different directions, and to do this in the narrowest possible space. The different polarization directions of the incoming radiation and the back-reflected radiation to be recycled enable a polarization-dependent differentiation and thus the provision of different propagation directions.

In this manner it is possible to realize such a light module with extremely small geometric dimensions, as a result of which it is also possible to realize the corresponding projection engine with particularly small installation space.

A particularly preferred embodiment is characterized in that the first beam splitter is arranged such that the angle of incidence of the radiation emitted by the laser apparatus is between 30° and 60°, preferably 45°. In this manner, it is possible to realize a particularly compact structural form of a light module according to the invention.

The luminous wheel preferably has at least one sector coated with a phosphor, wherein the at least one phosphor is adapted to emit, when it is excited by radiation in the blue wavelength range, radiation in another wavelength range. With respect to FIG. 1, phosphors that convert the radiation in the blue wavelength range into radiation in the red, yellow or green wavelength ranges are particularly suitable here.

With particular preference, the first beam splitter is configured to transmit the radiation below a prespecifiable wavelength and with the polarization as is emitted by the laser apparatus, and to reflect radiation below the prespecifiable wavelength and with a polarization as is present after two passages through the polarization manipulation apparatus in different directions. In this manner, the first beam splitter alone can be used to transmit excitation radiation from the laser apparatus in the direction of the luminous wheel while deflecting radiation which is to be recycled, i.e. was not converted, in the direction of the projection engine.

In this context it is particularly advantageous if the luminous wheel has at least one sector which is configured to reflect radiation at least in the blue wavelength range, wherein the first beam splitter is furthermore configured to reflect radiation above the prespecifiable wavelength and with a polarization as is present after two passages through the polarization manipulation apparatus in different directions. In this manner, the beam splitter not only deflects radiation to be recycled, but also the radiation that has already been converted by the respective phosphor. Such a light module achieves the desired optical function with a minimum number of optical components.

Alternatively, the luminous wheel can also have at least one sector which is configured to transmit radiation at least in the blue wavelength range, wherein the first beam splitter is furthermore configured to reflect radiation above the prespecifiable wavelength and with a polarization as is present after two passages through the polarization manipulation apparatus in different directions, wherein the light module furthermore has a mirror which is configured and arranged to reflect radiation that has passed through the at least one sector back onto the at least one sector. In this manner, less high power densities occur on the substrate surface of the luminous wheel, as a result of which its lifetime can be extended. Furthermore, individual adjustment of the blue radiation component is made possible. Here, the mirror can have a curved design, as a result of which an additional collimating apparatus is no longer needed. However, the mirror can also be configured as a plane mirror, wherein the light module in that case comprises a collimating apparatus arranged in the beam path between the luminous wheel and the plane mirror.

The polarization manipulation apparatus can be arranged in the beam path of the radiation emitted by the laser apparatus between the first beam splitter and the focusing apparatus. The result in this case is an extremely compact construction of the light module.

Alternatively, the polarization manipulation apparatus can be arranged in the beam path of the radiation emitted by the laser apparatus between the luminous wheel and the mirror. As a result, only the blue radiation need pass through the polarization manipulation apparatus and not the converted radiation components. As a result, the losses and the demands placed on the antireflective layers on the polarization manipulation apparatus are significantly reduced.

Alternatively to the above-mentioned configuration of the first beam splitter, the luminous wheel can have at least one sector which is configured to reflect radiation at least in the blue wavelength range, wherein the light module furthermore comprises a second beam splitter, which is arranged in the beam path between the polarization manipulation apparatus and the focusing apparatus, wherein the second beam splitter is configured to transmit radiation below the prespecifiable wavelength and to reflect radiation above the prespecifiable wavelength. In this alternative, the light module furthermore comprises a mirror, which is arranged in the beam path of radiation that has been reflected by the first beam splitter, and also a third beam splitter which is arranged in the beam path of radiation that has been reflected by the second beam splitter and which also is arranged in the beam path of radiation that has been reflected by the mirror, wherein the third beam splitter is adapted to transmit radiation above the prespecifiable wavelength and to reflect radiation below the prespecifiable wavelength. In this manner, the first beam splitter need not be configured to be wavelength-sensitive, rather it suffices to configure it to be polarization-sensitive. The second beam splitter, on the other hand, does not need to be configured to be polarization-sensitive, but can be configured to be only wavelength-sensitive. This permits a more cost-effective realization of such a light module according to the invention.

The prespecifiable wavelength is at least 450±15 nm, in particular 462 to 465 nm.

The polarization manipulation apparatus is in particular a $\lambda/4$ wave plate or a Faraday rotator. In particular a $\lambda/4$ wave plate makes possible a very compact construction of a light module according to the invention.

The radiation emitted by the laser apparatus is preferably polarized parallel to the plane of incidence of the first beam splitter and/or polarized perpendicular to the plane of incidence of the first beam splitter. The parallel polarization will be referred to as p-polarization below, and the perpendicular polarization as s-polarization.

The preferred embodiments proposed with respect to the light module according to the invention and their advantages apply, where applicable, correspondingly to the method according to the invention.

BRIEF DESCRIPTION OF THE DRAWINGS

The present invention will be described in more detail below with reference to the accompanying drawings, in which.

DETAILED DESCRIPTION OF THE DRAWINGS

Figure 1:
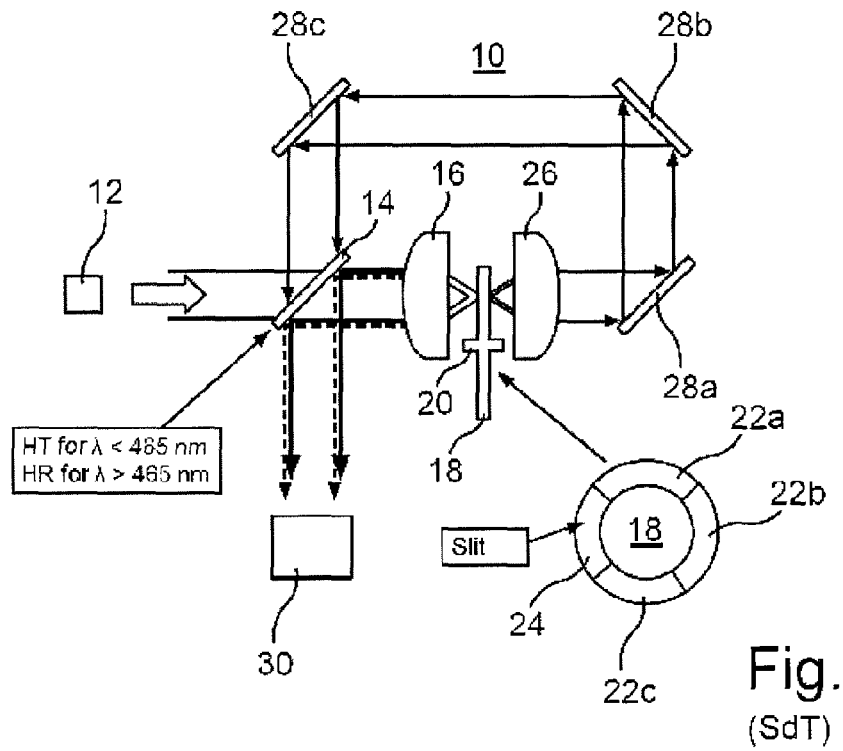
FIG. 1 shows in schematic illustration a light module known from the prior art.

For identical components and components having the same function the reference numerals introduced with respect to FIG. 1 will be used below. For the sake of clarity, they will not be introduced again.

Figure 2:
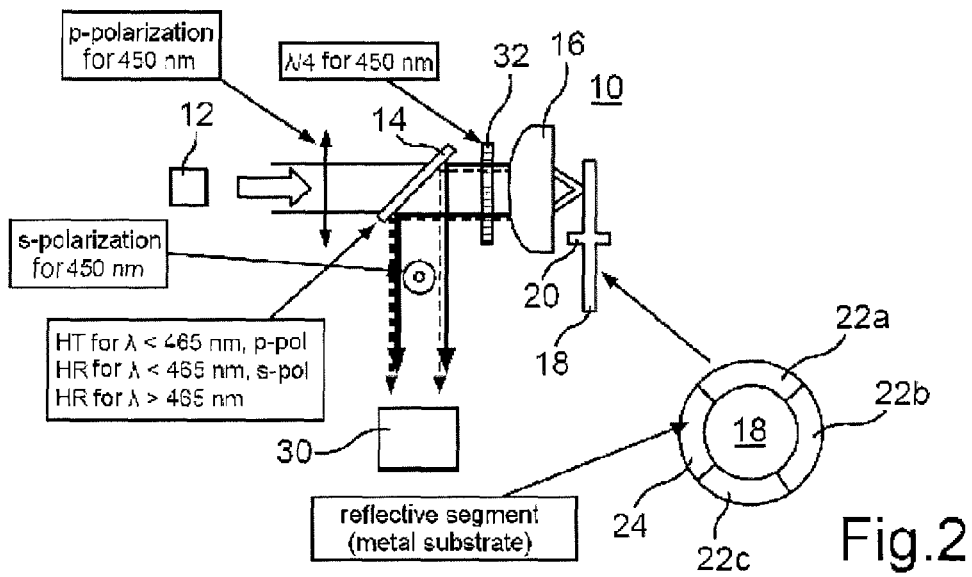
FIG. 2 shows in schematic illustration a first exemplary embodiment of a light module according to the invention.

FIG. 2 shows in schematic illustration a first exemplary embodiment of a light module 10 according to the invention. In the subsequent exemplary embodiments, it is assumed that the radiation in the blue wavelength range emitted by the laser apparatus 12 is p-polarized. However, it may also be s-polarized, or comprise a mixture of s-polarized and p-polarized radiation components.

p-polarized radiation is marked by a double-headed arrow, whereas s-polarized radiation is marked by a point in a circle, see the corresponding illustrations in FIG. 2.

In contrast to the illustration of FIG. 1, the sector 24 is configured to reflect radiation at least in the blue wavelength range. A polarization manipulation apparatus 32, which in the present case is configured as a λ/4 wave plate, is arranged according to the invention in the beam path of the radiation emitted by the laser apparatus 12, between the first beam splitter 14 and the focusing apparatus 16. Said polarization manipulation apparatus ensures that the polarization of radiation that passes through it twice in different directions is rotated through 90°. The mirror 14 is configured to transmit radiation below 465 nm and with a polarization as is emitted by the laser apparatus 12, i.e. p-polarized. By contrast, radiation below 465 nm and with a polarization as is present after two passages through the λ/4 wave plate in different directions, i.e. s-polarized, is reflected. Furthermore, the mirror 14 is configured to reflect radiation above 465 nm, i.e. radiation as is present after conversion on the sectors 22a, 22b, 22c of the luminous wheel 18.

The light module according to the invention illustrated in FIG. 2 thus makes do with a minimum number of optical components. The linearly polarized radiation from the laser apparatus 12 used as the radiation source is circularly polarized after passage through the wave plate 32 and is then reflected by the metallic surface of the phosphor wheel 18 within the uncoated segment 24. Owing to the reflection, the propagation direction and thus the chirality of the radiation changes, i.e. right-handed circularly polarized radiation becomes left-handed circularly polarized radiation and vice versa. After another passage through the same wave plate 32, the blue radiation is then once again linearly polarized, but with a polarization direction that is rotated through 90°, i.e. p-polarized radiation becomes s-polarized radiation and the other way around. Radiation which is polarized perpendicular to the paper plane is then reflected to the beam splitter 14, as are the radiation components generated by conversion, and in this way guided in the direction of the projection engine 30.

Figure 3:
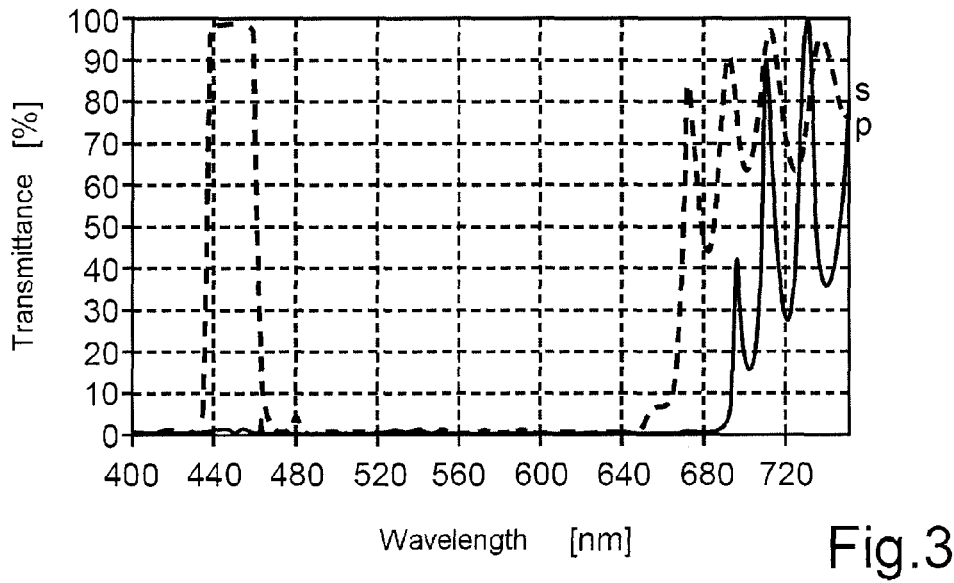
FIG. 3 shows the dependence of the transmittance on the wavelength of the beam splitter used in the exemplary embodiment of FIG. 2.

FIG. 3 shows the transmittance in percentage over the wavelength in nanometers of a suitable beam splitter 14. Here, the transmittance of p-polarized radiation is plotted in dashed lines, that of s-polarized radiation in solid lines. It is clear that p-polarized radiation between approximately 440 to 460 nm is transmitted very well. p-polarized radiation is once again transmitted starting from approximately 670 nm, i.e. at the long-wave end of the visible range, whereas s-polarized radiation in the range between 440 and 460 nm is reflected. Components of s-polarized radiation are transmitted only above 690 nm. However, these are likewise at the long-wave end of the visible range and make no significant contribution to the luminous flux. These losses are therefore acceptable.

Figure 4:
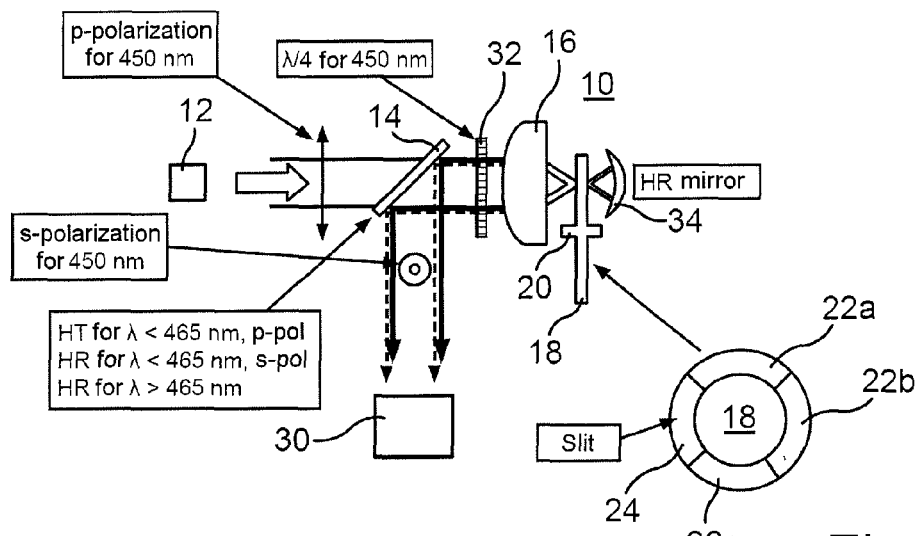
FIG. 4 shows in schematic illustration a second exemplary embodiment of a light module according to the invention.

In the exemplary embodiment illustrated in FIG. 2, high power densities occur on the substrate surface of the luminous wheel 18, and the blue radiation component cannot be individually adjusted. These problems can be addressed appropriately using the exemplary embodiment illustrated in FIGS. 4 and 5:

In the exemplary embodiment illustrated in FIG. 4, a highly reflective mirror 34 is provided, which is configured and arranged to reflect radiation that has passed through the sector 24 back onto the at least one sector 24. The sector 24 is configured as a slit. In the exemplary embodiment illustrated in FIG. 5, a collimating lens 36 and a plane mirror 38 are used instead of the curved mirror 34.

Figure 5:
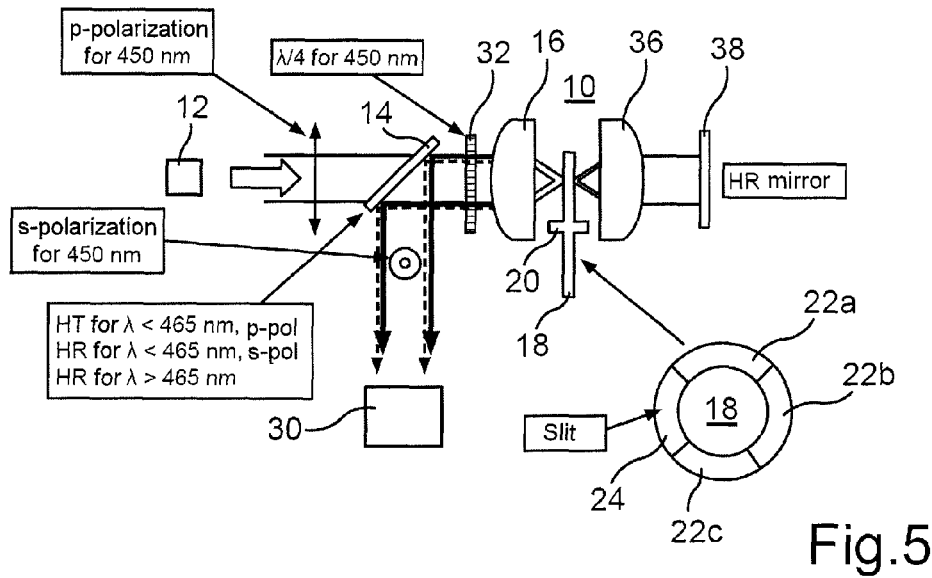
FIG. 5 shows in schematic illustration a third exemplary embodiment of a light module according to the invention.
Figure 6:
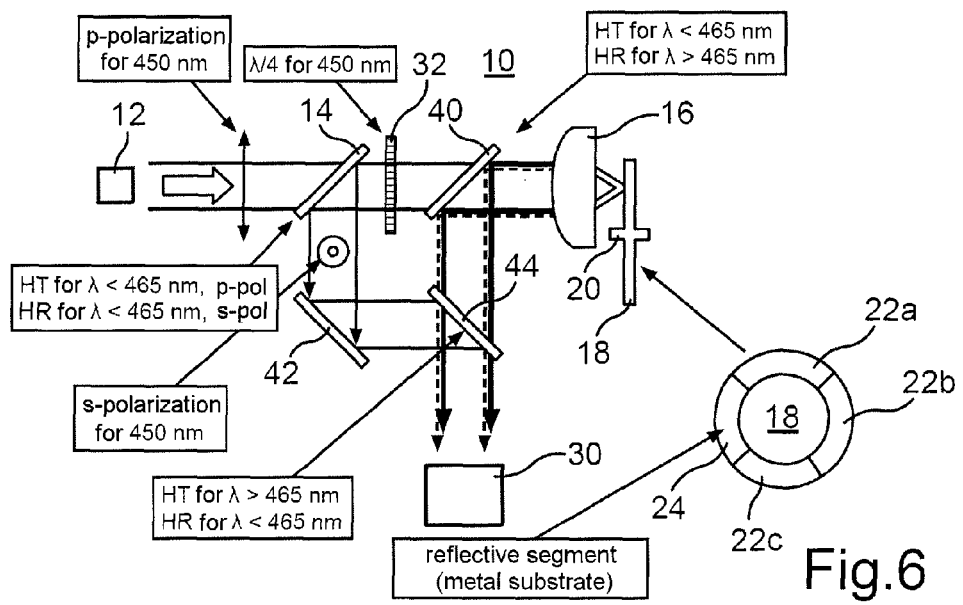
FIG. 6 shows in schematic illustration a fourth exemplary embodiment of a light module according to the invention.

While the exemplary embodiments illustrated in FIGS. 2, 4 and 5 require a polarization-sensitive beam splitter 14, the exemplary embodiment illustrated in FIG. 6 does not. However, it requires additional optical elements. The beam splitter in the exemplary embodiment of FIG. 6 needs to be configured to be merely polarization-sensitive and not wavelength-sensitive.

The beam splitter 14 used in the exemplary embodiment of figure is configured to be highly transmissive for p-polarized radiation at a wavelength of λ<465 nm and highly reflective for s-polarized radiation likewise at a wavelength of λ<465 nm. Arranged between the wave plate 32 and the phosphor wheel 18, however, is a tilted optical element, in the present case a beam splitter 40, which is highly transmissive for radiation of λ<465 nm, i.e. the radiation in the blue wavelength range provided by the laser apparatus 12, and highly reflective for converted radiation, i.e. radiation in a wavelength range of λ>465 nm. In order to combine the recycled radiation in the blue wavelength range with the converted radiation, two further optical elements are necessary, namely a mirror 42 and a beam splitter 44 that is highly transmissive for radiation in a wavelength range of λ>465 nm and highly reflective for radiation of λ<465 nm. Owing to the additional optical components, however, the installation space required for this embodiment is greater than for the embodiments according to FIGS. 2 to 3, 4 and 5.

Figure 7:
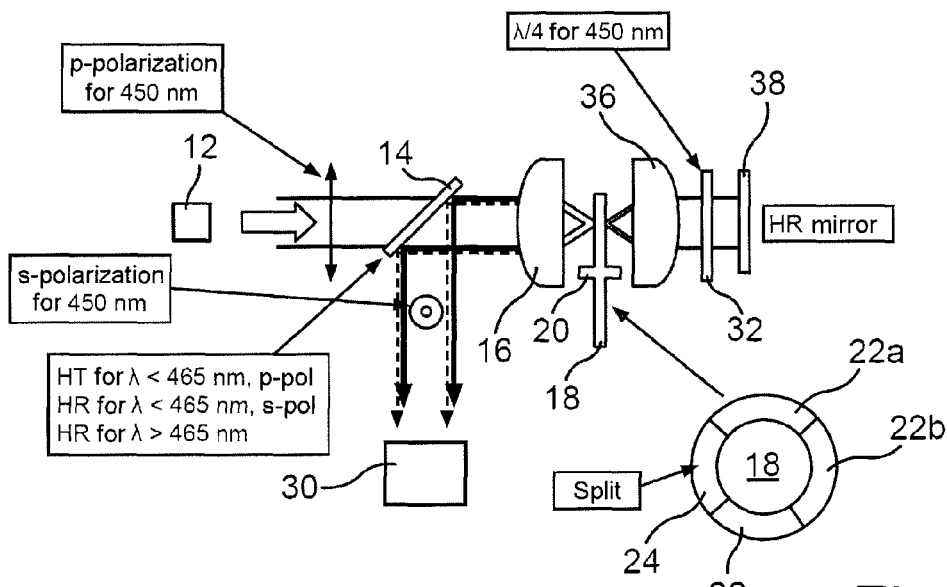
FIG. 7 shows in schematic illustration a fifth exemplary embodiment of a light module according to the invention.

A particularly advantageous exemplary embodiment of a light module according to the invention is illustrated in FIG. 7. In a modification of the exemplary embodiment illustrated in FIG. 5, the wave plate 32 in this case is located between the mirror 38 and the luminous wheel 18. The embodiment illustrated in FIG. 4 could be changed accordingly. Owing to this measure, only the blue radiation needs to pass through the wave plate 32 and not the converted radiation components. As a result, the losses and the demands placed on the antireflective layers on the wave plate are significantly reduced.

In practice, further lenses for beam guidance can be provided between the deflection mirrors and beam splitters, although for the sake of clarity these are not illustrated in the schematic illustrations of the exemplary embodiments.

The present invention can be used to produce LARP light modules, which in terms of installation space can compete with compact discharge lamps as regards surface area requirements.

Except for the exemplary embodiment illustrated in FIG. 6, the beam splitter 14 is configured to be dichroic. In FIG. 6, the second beam splitter 40 is configured to be dichroic.

The invention claimed is:
1. A light module for a projection apparatus, comprising:
   a laser apparatus adapted to emit linearly polarized radiation in a blue wavelength range;
   a luminous wheel arranged in the beam path of the radiation emitted by the laser apparatus;
   a first beam splitter arranged in the beam path of the radiation emitted by the laser apparatus between the laser apparatus and the luminous wheel;
   a focusing apparatus arranged in the beam path of the radiation emitted by the laser apparatus between the first beam splitter and the luminous wheel; and
   at least one polarization manipulation apparatus, arranged in the beam path of the radiation emitted by the laser apparatus between the first beam splitter and the luminous wheel, which is adapted to rotate the polarization of radiation that has passed through it twice in different directions through 90°,
   wherein the first beam splitter is arranged in the beam path of radiation in the blue wavelength range which has passed twice through the polarization manipulation apparatus in different directions.
2. The light module as claimed in claim 1, wherein the first beam splitter is arranged such that the angle of incidence of the radiation emitted by the laser apparatus is between 30° and 60°.

3. The light module as claimed in claim 1, wherein the luminous wheel has at least one sector coated with a phosphor, wherein the at least one phosphor is adapted to emit, when it is excited by radiation in the blue wavelength range, radiation in another wavelength range.

4. The light module as claimed in claim 1, wherein the first beam splitter is configured
- to transmit radiation below a prespecifiable wavelength and with the polarization as is emitted by the laser apparatus, and
- to reflect radiation below the prespecifiable wavelength and with a polarization as is present after two passages through the polarization manipulation apparatus in different directions.

5. The light module as claimed in claim 4, wherein the luminous wheel has at least one sector which is configured to reflect radiation at least in the blue wavelength range, and wherein the first beam splitter is furthermore configured to reflect radiation above the prespecifiable wavelength and with a polarization as is present after two passages through the polarization manipulation apparatus in different directions.

6. The light module as claimed in claim 4, wherein the luminous wheel has at least one sector which is configured to transmit radiation at least in the blue wavelength range,
- wherein the first beam splitter is furthermore configured to reflect radiation above the prespecifiable wavelength and with a polarization as is present after two passages through the polarization manipulation apparatus in different directions, and
- wherein the light module furthermore has a mirror, which is configured and arranged to reflect radiation that has passed through the at least one sector back onto the at least one sector.

7. The light module as claimed in claim 6, wherein the mirror is configured to be curved.

8. The light module as claimed in claim 6, wherein the mirror is configured as a plane mirror, and wherein the light module comprises a collimating apparatus arranged in the beam path between the luminous wheel and the mirror.

9. The light module as claimed in claim 5, wherein the polarization manipulation apparatus is arranged in the beam path of the radiation emitted by the laser apparatus between the first beam splitter and the focusing apparatus.

10. The light module as claimed in claim 6, wherein the polarization manipulation apparatus is arranged in the beam path of the radiation emitted by the laser apparatus between the luminous wheel and the mirror.

11. The light module as claimed in 1, wherein the luminous wheel has at least one sector which is configured to reflect radiation at least in the blue wavelength range;
- wherein the light module furthermore comprises:
- a second beam splitter, which is arranged in the beam path between the polarization manipulation apparatus and the focusing apparatus, wherein the second beam splitter is configured to transmit radiation below the prespecifiable wavelength and to reflect radiation above the prespecifiable wavelength;
- a mirror, which is arranged in the beam path of radiation that has been reflected by the first beam splitter; and
- a third beam splitter which is arranged in the beam path of radiation that has been reflected by the second beam splitter and which is also arranged in the beam path of radiation that has been reflected by the mirror, wherein the third beam splitter is adapted to transmit radiation above the prespecifiable wavelength and to reflect radiation below the prespecifiable wavelength.

12. The light module as claimed in claim 4, wherein the prespecifiable wavelength is at least 448 nm.

13. The light module as claimed in claim 1, wherein the polarization manipulation apparatus is a λ/4 wave plate or a Faraday rotator.

14. The light module as claimed in claim 1, wherein the radiation emitted by the laser apparatus is one or both of polarized parallel to the plane of incidence of the first beam splitter and polarized perpendicular to the plane of incidence of the first beam splitter.

15. A method for generating the blue component in a light module for a projection apparatus, wherein the light module comprises a laser apparatus adapted to emit linearly polarized radiation in the blue wavelength range, a luminous wheel arranged in the beam path of the radiation emitted by the laser apparatus, a first beam splitter arranged in the beam path of the radiation emitted by the laser apparatus between the laser apparatus and the luminous wheel, and a focusing apparatus arranged in the beam path of the radiation emitted by the laser apparatus between the first beam splitter and the luminous wheel;
- wherein the method comprises the steps of:
- arranging, in the beam path of the radiation emitted by the laser apparatus between the first beam splitter and the luminous wheel, a polarization manipulation apparatus which is adapted to rotate the polarization of radiation that has passed through it twice through 90°; and
- arranging the first beam splitter such that it is also located in the beam path of radiation in the blue wavelength range which has passed twice through the polarization manipulation apparatus in different directions.

16. The light module as claimed in claim 1, wherein the first beam splitter is arranged such that the angle of incidence of the radiation emitted by the laser apparatus is 45°.

17. The light module as claimed in claim 1, wherein the prespecifiable wavelength is 462 to 465 nm.

18. A light module for a projection apparatus, comprising:
- a laser apparatus adapted to emit linearly polarized radiation in a blue wavelength range;
- a luminous wheel arranged in the beam path of the radiation emitted by the laser apparatus;
- a first beam splitter arranged in the beam path of the radiation emitted by the laser apparatus between the laser apparatus and the luminous wheel;
- a focusing apparatus arranged in the beam path of the radiation emitted by the laser apparatus between the first beam splitter and the luminous wheel; and
- at least one polarization manipulation apparatus, which is adapted to rotate the polarization of radiation that has passed through it twice in different directions through 90°,
- wherein:
- the first beam splitter is arranged in the beam path of radiation in the blue wavelength range which has passed twice through the polarization manipulation apparatus in different directions,
- the first beam splitter is configured to transmit radiation that is in the blue wavelength range and has the polarization as is emitted by the laser apparatus,
- the first beam splitter is configured to reflect radiation that is in the blue wavelength range and has a polarization as is present after two passages through the polarization manipulation apparatus in different directions, and
- the first beam splitter is configured to reflect radiation having a wavelength above the blue wavelength range.

* * * * *